(12) United States Patent
Maione et al.

(10) Patent No.: US 10,549,821 B2
(45) Date of Patent: Feb. 4, 2020

(54) TRANSPARENT MODULATABLE KAYAK WITH SHADING SYSTEM

(71) Applicant: MAIONE S.R.L., San Felice a Cancello (CE) (IT)

(72) Inventors: Roberto Maione, San Felice a Cancello (IT); Antonio Maione, San Felice a Cancello (IT)

(73) Assignee: MAIONE S.R.L., San Felice a Cancello (CE) (IT)

( * ) Notice: Subject to any disclaimer, the term of this patent is extended or adjusted under 35 U.S.C. 154(b) by 0 days.

(21) Appl. No.: 16/086,737

(22) PCT Filed: Mar. 8, 2017

(86) PCT No.: PCT/IB2017/051354
§ 371 (c)(1),
(2) Date: Sep. 20, 2018

(87) PCT Pub. No.: WO2017/163142
PCT Pub. Date: Sep. 28, 2017

(65) Prior Publication Data
US 2019/0100289 A1   Apr. 4, 2019

(30) Foreign Application Priority Data
Mar. 21, 2016   (IT) ........................ 102016000029298

(51) Int. Cl.
*B63B 35/71* (2006.01)
*B63B 17/02* (2006.01)
(Continued)

(52) U.S. Cl.
CPC ............... *B63B 35/71* (2013.01); *B63B 1/14* (2013.01); *B63B 17/02* (2013.01); *B63B 7/04* (2013.01); *B63B 2035/715* (2013.01)

(58) Field of Classification Search
CPC .... B63H 9/00; B63H 9/06; B63H 9/08; B63B 1/00; B63B 1/12; B63B 1/14;
(Continued)

(56) References Cited

U.S. PATENT DOCUMENTS 3,896,832 A * 7/1975 Montoya ................. B63B 17/02
114/361
5,189,974 A * 3/1993 Masters .................... B63B 1/12
114/347
(Continued)

OTHER PUBLICATIONS

International Search Report, dated May 3, 2017, from corresponding PCT/IB2017/051354 application.

*Primary Examiner* — Lars A Olson
(74) *Attorney, Agent, or Firm* — Young & Thompson

(57) ABSTRACT

A transparent modulatable kayak with shading system includes two pairs of fitting devices, reversibly connecting multiple kayaks. The tubular body of the paddle is reversibly divisible at the center. The inner volume of the hull has a container housing a cloth adapted to shade the user on the seat. The upper surface of the hull has a plurality of recesses, of which at least one pair is positioned at the bow and at least one pair is positioned at the stern, each housing a portion of the tubular body of the paddle. The tubular body includes, at each end, at least one coupling device adapted to reversibly connect at least one of the corresponding coupling devices of the cloth. The hull is made of any natural or synthetic polymer adapted to ensure the floating of the kayak and its total transparency.

20 Claims, 3 Drawing Sheets

(51) Int. Cl.
*B63B 7/04* (2006.01)
*B63B 1/14* (2006.01)

(58) Field of Classification Search
CPC ......... B63B 17/00; B63B 17/02; B63B 35/71;
B63B 7/00; B63B 7/04
USPC ........................................ 114/343, 347, 361
See application file for complete search history.

(56) References Cited

U.S. PATENT DOCUMENTS

| | | | | |
|---|---|---|---|---|
| 5,657,713 | A * | 8/1997 | Rowlett | ................. B63B 1/121 |
| | | | | 114/347 |
| 6,807,919 | B1 * | 10/2004 | Thomsen | ................. B63H 9/08 |
| | | | | 114/347 |
| 7,984,686 | B1 | 7/2011 | Solorzano | |
| 8,757,185 | B1 * | 6/2014 | Muzzio | ................. B63B 17/02 |
| | | | | 114/361 |
| 2003/0233971 | A1 | 12/2003 | Belyeu | |
| 2008/0121166 | A1 | 5/2008 | Yaron et al. | |
| 2015/0059637 | A1 | 3/2015 | Johns et al. | |

\* cited by examiner

TRANSPARENT MODULATABLE KAYAK WITH SHADING SYSTEM

FIELD OF THE ART

The present invention operates in the field of sports equipment, in particular water sports, and in detail it regards a particular kayak.

PRIOR ART

The object of the present invention is to propose a kayak addable with other kayaks of the same type, characterized in that they are completely transparent.

The term kayak generally indicates a small craft moved by the action of a paddle, i.e. an instrument provided with a tubular part and with one or two blades placed at the ends which, when immersed in the water, constitute the anchor point for the propulsion of the means, which occurs without mechanical constraints between the paddle and the means. Indeed, the paddle, unlike oars, is not connected to the boat through a pivot point (the oarlock); the transmission of the energy to the kayak therefore occurs through the anchor points of the canoeist/kayaker and is mainly entrusted to the force of the upper part of the body, through a muscular/kinetic chain that starts from the grip of the paddle with the hands.

In addition to the use of canoes and kayaks of all types for performing in sports competitions, these small boats are often used by bathers in order to go for a swim off the coast or enjoy some exercise even while on vacation at the sea.

Many different types of canoes or kayaks are available on the market for these types of users; they can range from standard shapes to very strange/particular creations.

For example, the patent US 2003 233971 (A1) describes a particular type of kayak equipped with removable, fittable and modular cockpit that makes the kayak useable for many different purposes. Another patent, US 2008 121166 (A1), claims a foldable kayak designed for being transported within a common family car, a characteristic that makes this kayak particularly adapted for a family that travels to the sea for summer vacation.

However, among the various types of existing kayaks, there is no modular kayak that can be added with other kayaks and which allows, after the physical activity, enjoying a pleasant moment of rest at sea, in the company of other canoeist/kayakers, without having to be careful regarding balancing.

Such objective is reached by means of the characteristics described in claim 1, and other versions of the invention are provided in the dependent claims.

DESCRIPTION OF THE INVENTION

According to the present invention, a transparent modulatable kayak is made, adapted to be coupled with other similar kayaks and also adapted for the installation of a shading system. Advantageously, said kayak is constituted by a hull 1, formed by a bow 1.1 and a stern 1.2 of complementary shape in a manner so as to be able to couple multiple hulls 1, one after the other, by means of fitting devices 4. Said fitting devices 4 are advantageously also present on the sides of the kayak in order to allow reversibly connecting multiple hulls 1 alongside each other.

Advantageously said fitting devices 4 are constituted by any mechanism that can be found on the market adapted to stably and reversibly connect two corresponding parts; in this case, said device can be made of any natural or synthetic material that floats and resists the marine environment, preferably plastic or rubber. In order to provide a connection that is even more stable, said fitting devices 4 can also be advantageously provided with a pivot or with a screw that traverses the two parts of the fitting device 4 that one wishes to connect, by mutually engaging them.

Advantageously said fitting devices 4 can also be provided with a hole 4.1 through which the user can pass a rope or a strip for tying the kayak to the car luggage rack or to any other type of support.

Advantageously said hull 1 can be constituted by two watertight compartments 5-5' of which only one can be flooded by means of a valve 5.1 placed on the external surface of the hull 1. In this manner, the floating line of the hull 1 can be lowered in order to facilitate the rowing of the user in case of strong wind.

The upper surface of the hull 1 is provided with an opening 1.4 through which the user inserts his/her legs and sits on the suitable seat 1.3, which advantageously can be adjustable through the pair of adjustable bands, one on the right and one on the left, which connect said seat 1.4 to the edge of the opening 1.4.

Said upper surface of said hull 1 is also provided with at least two pairs of recesses 1.5, one at the bow 1.1 and the other at the stern 1.2. Said recesses 1.5 are advantageously configured for housing a portion of the tubular body 2.1 of the paddle 2, which forms an integral part of the kayak.

Said paddle 2 is constituted by a pair of blades 2.2 connected at the ends of a tubular body 2.1 and by a connection system 2.3, preferably placed in the middle point of said tubular body 2.1, which advantageously allows reversibly dividing said tubular body 2.1 into at least two portions. At the point of contact between the end of the tubular body 2.1 and the blade 2.2, at least one coupling device 2.4 is advantageously arranged.

It is also possible to disconnect the blades 2.2 from the tubular body 2.1 of the paddle 2, in a manner such that, once the portions of tubular body 2.1 are inserted in the recesses 1.5, the blades 2.2 do not remain exposed to the wind. In this case, the internal space of the hull 1 will be advantageously provided with a blade holder pocket.

In the inner volume of the hull 1, a container 3.2 is advantageously arranged in which a cloth 3 is folded and placed; such cloth 3 preferably has rectangular form, provided at the four corners with four corresponding coupling devices 3.1 corresponding to said coupling devices 2.4 of said tubular body 2.1 of the paddle 2.

In this manner, two users who row in two different hulls 1 can advantageously be connected by means of said fitting devices 4, divide the respective paddles 2 into two parts, insert the two portions of tubular body 2.1 in the suitable recesses 1.5 and, by connecting the coupling devices 3.1 of said cloths 3 together and with the coupling devices 2.4 of said paddles 2, obtain a shaded space where it is possible to rest while at sea.

It is also advantageously possible to connect a further tubular body 2.1 to the already present tubular body 2.1 of the paddle 2, by means of a common fixing device 2.5, in a manner such that a user on his/her own can have four portions of tubular body 2.1 available to insert in the four recesses 1.5 in order to shade his/her own seat, without requiring another canoeist/kayaker.

If it is desired to couple together more than two kayaks, said paddles 2 can be advantageously provided with a plurality of coupling devices 2.4 for each end of said tubular body 2.1, in a manner so as to be able to connect the coupling devices 3.2 of multiple cloths 3 on the same portion of tubular body 2.1.

Advantageously, each component of the kayak of the present invention is floating and the hull 1 is preferably made of plexiglass or in any case of any other natural or artificial polymer adapted to ensure the floating of the hull 1 and its total transparency.

DESCRIPTION OF THE FIGURES

The invention will now be described hereinbelow in at least one preferred embodiment by way of a non-limiting example, with the aid of the enclosed figures in which.

DETAILED DESCRIPTION OF THE INVENTION

Figure 1:
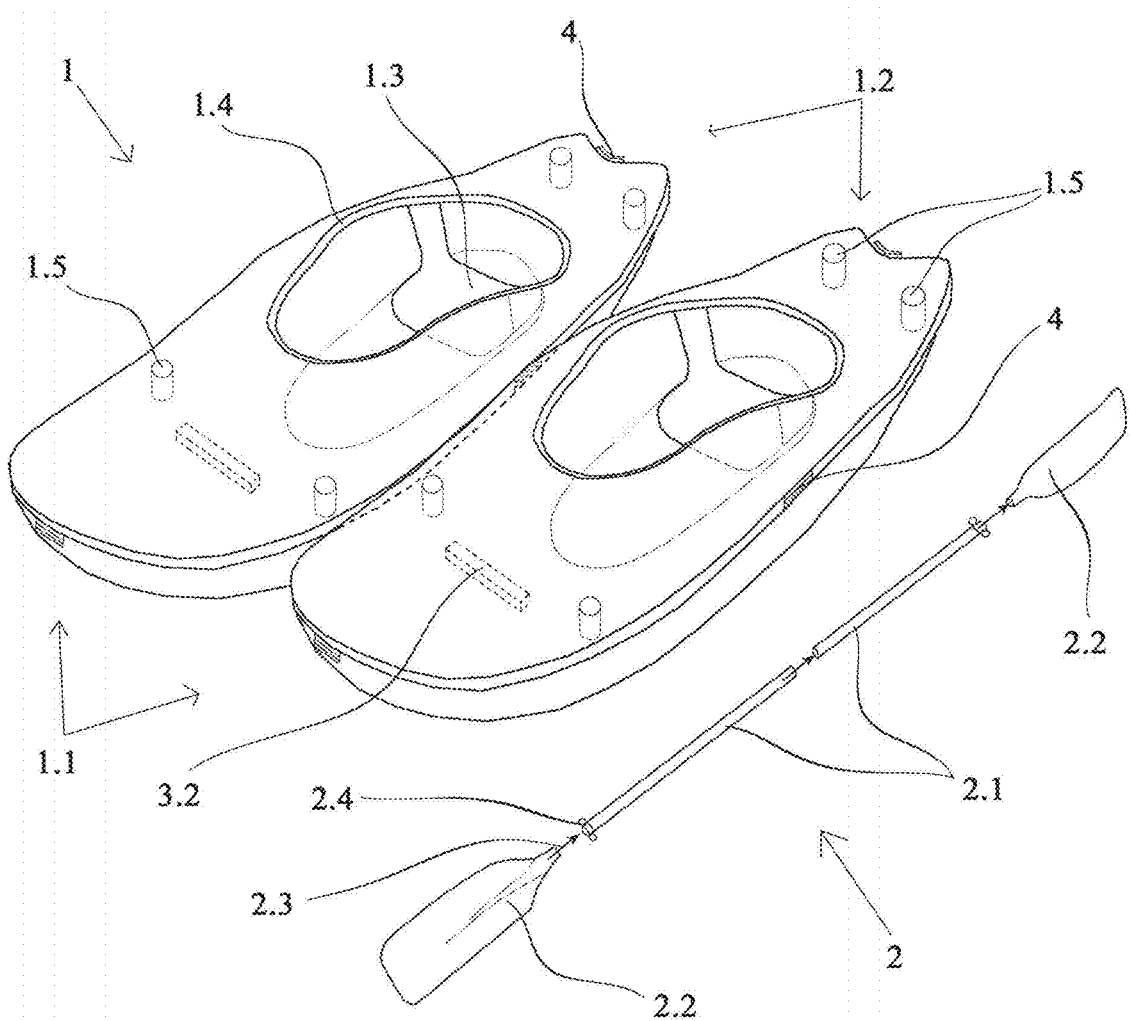
FIG. 1 illustrates two kayaks laterally connected by means of the lateral fitting devices 4, and for each hull 1 one sees the bow 1.1, the stern 1.2, the upper opening 1.4 through which the internal seat 1.*e* is visible, and on the upper surface one sees the four recesses 1.5 and the container 3.2 of the shading cloth is visible; on the side of the kayaks, one sees a paddle 2 constituted by the tubular body 2.1 which is divided into two parts by means of the connection system 2.3, and the coupling devices 2.5 at the blades 2.2.
Figure 2:
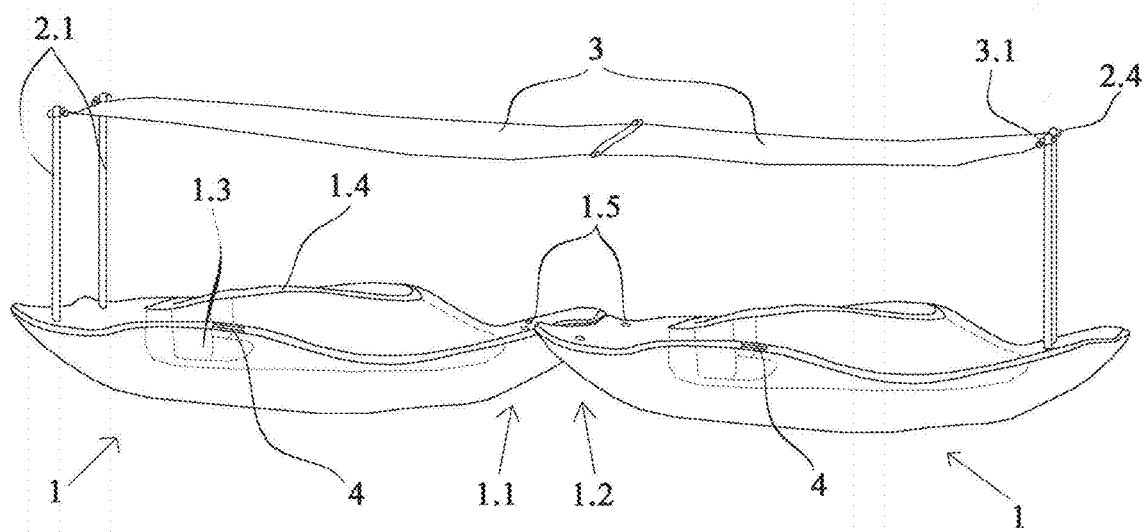
FIG. 2 shows two hulls 1 connected one behind the other by means of the fitting devices 4 for the bow 1.1 and stern 1.2, and one also sees the seat 1.3 which is accessed by means of the upper opening 1.4, and one sees the recesses 1.5, four of which occupied by the tubular body portions 2.1 of the paddles 2 which, at the top, have the coupling devices 2.4 connected to the coupling devices 3.1 of the cloth 3.

With reference to FIG. 1, two kayaks of the present invention are represented, mutually connected alongside each other by means of the fitting devices 4 placed on the sides of the hull 1. Said fitting devices 4 are also present on the bow 1.1 and on the stern 1.2 of the hull 1, in a manner so as to be able to connect the kayaks, even one after the other, as represented in FIG. 2.

Figure 3:
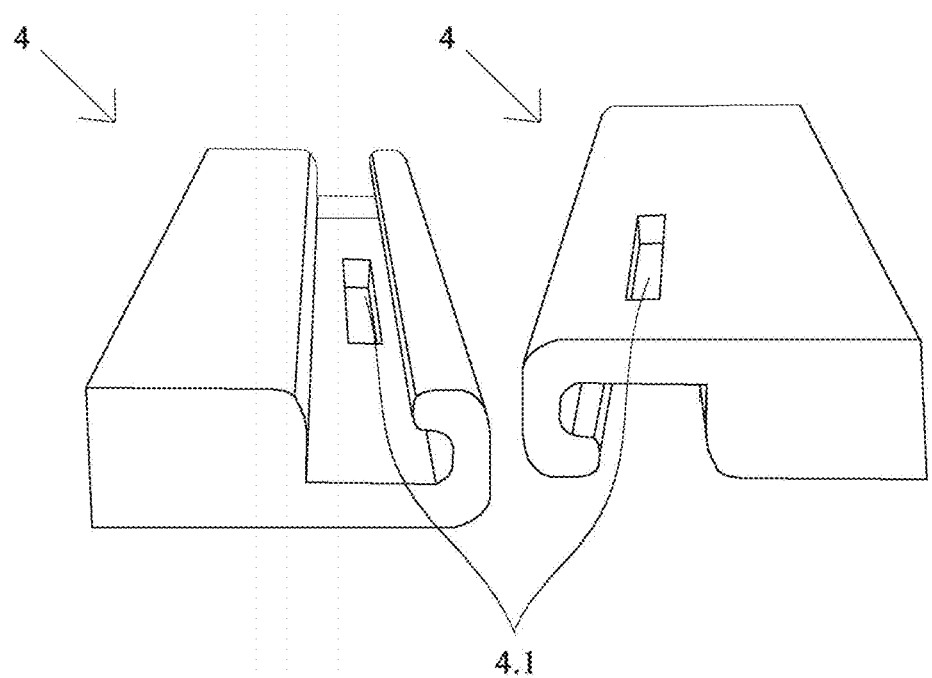
FIG. 3 illustrates two fitting devices 4, one for the right side and one for the left side of all the hulls 4, configured in a manner so as to be complementary and in this case provided with a hole 4.1 adapted to allow tying the hull 1 on any luggage rack.
Figure 4:
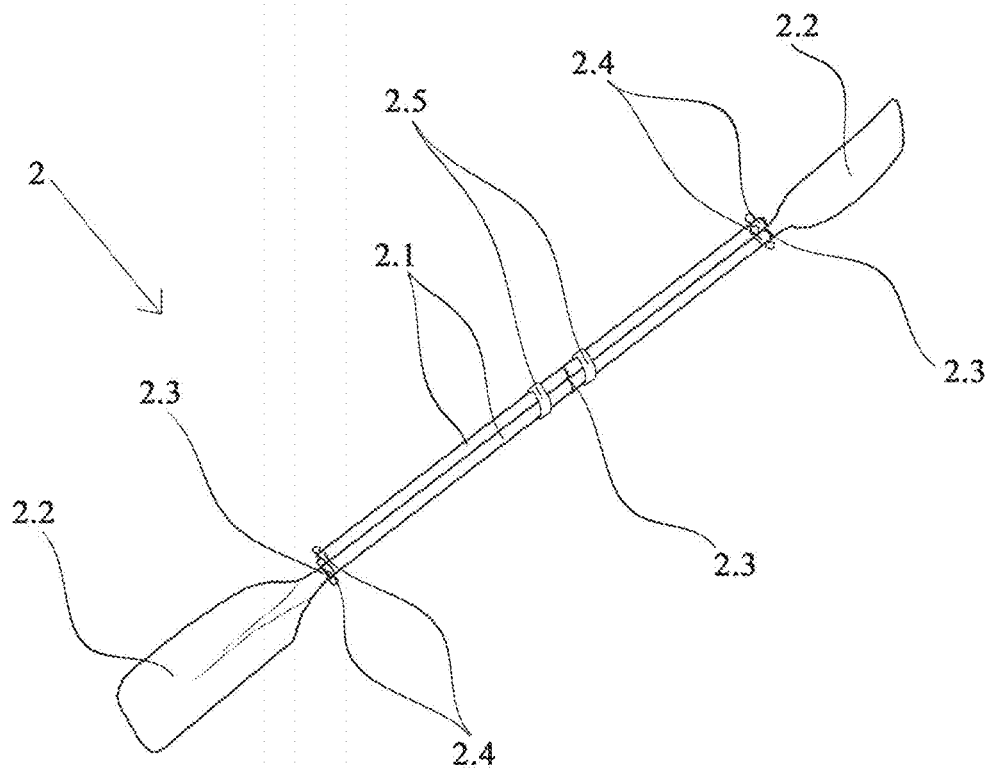
FIG. 4 shows a paddle 2 provided with two fixing devices 2.5 which connect the tubular body 2.1 with a further tubular body 2.1; one also sees the blades 2.2 connected to the tubular body 2.1 by means of the connection system 2.3 and the coupling devices 2.4.

In detail, one possible embodiment of said fitting devices 4 is represented in FIG. 3, in which one sees that the profile of the two parts that will be engaged is complementary and adapted to connect the two hulls 1 in a reversible manner. In the particular embodiment represented herein, said fitting devices 4 are traversed by a hole 4.1 that serves to allow an easy transportation of the hull 1, e.g. tied to the luggage rack of a machine, by passing a belt or a rope through said hole 4.1 in order to tie it to the support on which one intends to transport the kayak. In order to make the fitting even more stable, it is possible to make devices 4 equipped with a pin or a screw that traverses the two parts, connecting them in a fixed manner until the pin or the screw itself is removed.

Still with reference to FIG. 1, one can observe that the upper surface of the hull 1 is provided with an opening 1.4 through which the user has access to the inner volume of the kayak, in which the seat 1.3 and a container 3.2 are placed. In the preferred embodiment of the kayak, said seat 1.3 is connected to the edge of said opening 1.4 by means of a pair of adjustable bands, one on the right and one on the left, in a manner so as to adjust the height in accordance with the preferences of the user.

Alongside the kayaks, the paddle 2 is represented which constitutes the device through which the user propels the means. Said paddle 2 is constituted by a tubular body 2.1, and at the ends thereof blades 2.2 are connected. The particular feature of said tubular body 2.1 consists of the fact that it can be divided into at least two equivalent portions, due to a connection system 2.3 placed at the center of said tubular body 2.1. The division of the paddle 2 into two parts is, of course, reversible and said connection system 2.3 is preferably constituted by a screw system in which the thread of one tubular body portion 2.1 corresponds with the counter thread of the other portion.

Another particular feature of the paddle 2 consists of the fact that it is provided with at least two coupling devices 2.4 each placed at one end of the tubular body 2.1, at the attachment with the blade 2.2. Said coupling devices 2.4 serve to be reversibly connected with the cloth 3 placed inside the already mentioned container 3.2.

Said container 3.2 is in fact adapted to house, in a folded configuration, a cloth 3, adapted to shade the user who intends to rest after rowing.

Said cloth 3 preferably has rectangular form and is provided, at the four corners, with four corresponding coupling devices 3.2, for example constituted by common snap-hooks or hooks.

As represented in FIG. 2, due to the above-described characteristics, two kayaks can be attached and shaded by arranging the portions of paddles 2 in the suitable recesses 1.5 placed on the upper surface of the hull 1 and connecting the respective cloths 3 both together and with the coupling devices 2.4 placed at the ends of the paddles 2.

If it is desired to attach multiple hulls 1 together and shade them, it is useful to arrange a plurality of coupling devices 2.4 on said paddles so to be able to connect with the respective coupling devices 3.2 of a plurality of cloths 3.

In the preferred embodiment of the present invention, the tubular body 2.1 of the paddle 2 is also provided with a common fixing device 2.5, which allows only one canoeist/kayaker to carry two tubular bodies 2.1 therewith, in a manner such that by dividing each tubular body 2.1 into two parts, he/she can insert them into the four recesses 1.5 of the hull 1 and, connecting said cloth 3 thereto in the above-described manner, he/she can shade himself without requiring another canoeist/kayaker.

Another possible embodiment of the kayak provides for the possibility of also disconnecting the blades 2.2 from the tubular body 2.1 of the paddle 2, in a manner such that, once the cloth 3 is mounted, the blades 2.2 do not project upward, remaining exposed to the wind. In this case, in the inner volume of the hull 1, a blade holder pocket will be arranged so to avoid losing the blades in the water.

Figure 5:
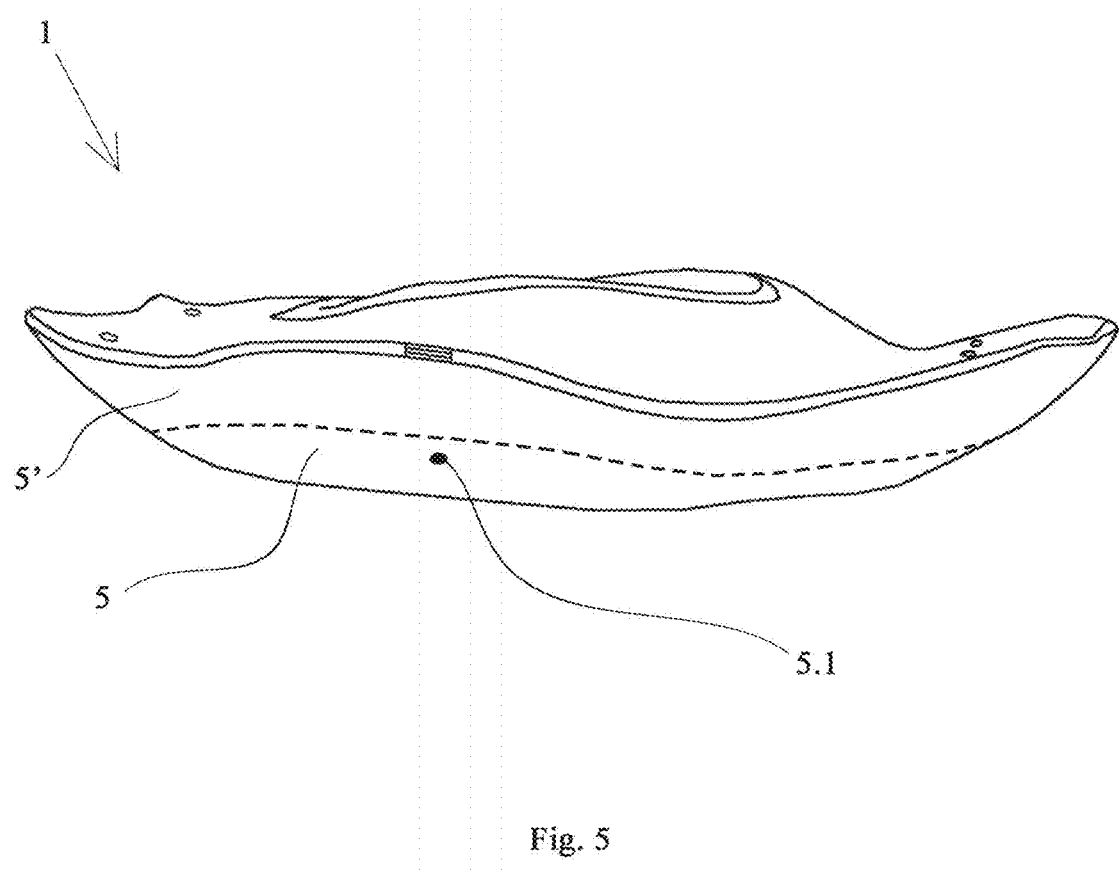
FIG. 5 illustrates a side view of a kayak in which one sees that the hull 1 is divided into two watertight compartments 5-5' of which the lower can be flooded by means of the valve 5.1 placed on the side of the kayak.

In one version of the present invention, the hull 1 is divided into two watertight compartments 5-5', as represented in FIG. 5, including an upper compartment that is always dry, while a lower compartment is floodable by actuating a suitable valve 5.1. This option allows the canoeist/kayaker to lower the floating line of the kayak in case of strong wind conditions.

The main characteristic that aesthetically marks the kayak of the present invention is the total transparency of the hull 1, which is preferably made of plexiglass or in any case of any other polymer that ensures the floating and transparency of the hull 1.

Finally, it is clear that modifications, additions or variants that are obvious for a man skilled in the art can be made to the invention described up to now, without departing from the protective scope that is provided in the enclosed claims.

The invention claimed is:

1. A transparent modulatable kayak with shading system, constituted by a hull (1) provided with a bow (1.1) and a stern (1.2) and with an opening (1.4) on the upper surface through which a user can access a seat (1.3) placed in the inner volume of said hull (1), also provided with a paddle (2) constituted by a pair of blades (2.2), each placed at an end of a tubular body (2.1); said kayak comprising at least two pairs of fitting devices (4), placed at the bow (1.1) and at the stern (1.2) and on the two sides of the hull (1), adapted to reversibly connect multiple kayaks, constituted by any one reversible coupling system made of any plastic polymer, floating and resistant to a marine environment; said tubular body (2.1) of said paddle (2) being reversibly divisible at a center by means of a common connection system (2.3); the inner volume of said hull (1) being provided with a common container (3.2) adapted to house, in a folded configuration, at least one cloth (3) adapted to shade the user placed on the seat (1.3) of said kayak; the upper surface of said hull (1) being provided with a plurality of recesses (1.5), including at least one pair positioned at the bow (1.1) and at least one pair positioned at the stern (1.2), each adapted to house a portion of said tubular body (2.1) of said paddle (2); said tubular body (2.1) being provided, at each end, with at least one coupling device (2.4) adapted to reversibly connect at least one of the corresponding coupling devices (3.1) of said cloth (3); said hull (1) further comprising any natural or synthetic polymer adapted to ensure the floating of the kayak and its total transparency.

2. The transparent modulatable kayak with shading system, according to claim 1, wherein said seat (1.3) is connected to the edge of said opening (1.4) by means of a pair of adjustable bands which allow the adjustment of the height of said seat.

3. The transparent modulatable kayak with shading system, according to claim 1, wherein the polymer forming said hull (1) is plexiglass.

4. The transparent modulatable kayak with shading system, according to claim 1, wherein said tubular body (2.1) of said paddle (2) is provided with a connection system (2.3) also at the point of contact between said tubular body (2.1) and each of the two blades (2.2).

5. The transparent modulatable kayak with shading system, according to claim 4, wherein the inner volume of said hull (1) is provided with a blade holder pocket adapted to contain the blades (2.2) which have been disconnected from the tubular body (2.1) of the paddle (2).

6. The transparent modulatable kayak with shading system, according to claim 1, wherein said paddle (2) is provided with a plurality of coupling devices (2.4) for each of the two ends of said tubular body (2.1).

7. The transparent modulatable kayak with shading system, according to claim 1, wherein said tubular body (2.1) of said paddle (2) is provided with at least one fixing device (2.5), constituted by any one reversible coupling system adapted to reversibly connect a further tubular body (2.1).

8. The transparent modulatable kayak with shading system, according to claim 1, wherein said fitting device (4) is provided with a through pin provided with a common thread, adapted to reversibly fix two kayaks together by traversing the fitting device (4) of a first kayak and of a second kayak provided with the corresponding counter thread; said fitting device (4) possibly being provided with a hole (4.1) adapted to allow the passage of a rope or a strip for tying said hull (1) to any one support.

9. The transparent modulatable kayak with shading system, according to claim 1, further comprising at least two watertight compartments (5, 5') of which one can be flooded by means of a suitable valve (5.1).

10. The transparent modulatable kayak with shading system, according to claim 1, wherein each component thereof is floating.

11. The transparent modulatable kayak of claim 1, wherein the cloth is rectangular and provided with at least four coupling devices (3.1), each placed at a corner.

12. The transparent modulatable kayak with shading system, according to claim 2, wherein the polymer forming said hull (1) is plexiglass.

13. The transparent modulatable kayak with shading system, according to claim 2, wherein said tubular body (2.1) of said paddle (2) is provided with a connection system (2.3) also at the point of contact between said tubular body (2.1) and each of the two blades (2.2).

14. The transparent modulatable kayak with shading system, according to claim 3, wherein said tubular body (2.1) of said paddle (2) is provided with a connection system (2.3) also at the point of contact between said tubular body (2.1) and each of the two blades (2.2).

15. The transparent modulatable kayak with shading system, according to claim 2, wherein said paddle (2) is provided with a plurality of coupling devices (2.4) for each of the two ends of said tubular body (2.1).

16. The transparent modulatable kayak with shading system, according to claim 3, wherein said paddle (2) is provided with a plurality of coupling devices (2.4) for each of the two ends of said tubular body (2.1).

17. The transparent modulatable kayak with shading system, according to claim 4, wherein said paddle (2) is provided with a plurality of coupling devices (2.4) for each of the two ends of said tubular body (2.1).

18. The transparent modulatable kayak with shading system, according to claim 5, wherein said paddle (2) is provided with a plurality of coupling devices (2.4) for each of the two ends of said tubular body (2.1).

19. The transparent modulatable kayak with shading system, according to claim 2, wherein said tubular body (2.1) of said paddle (2) is provided with at least one fixing device (2.5), constituted by any one reversible coupling system adapted to reversibly connect a further tubular body (2.1).

20. The transparent modulatable kayak with shading system, according to claim 3, wherein said tubular body (2.1) of said paddle (2) is provided with at least one fixing device (2.5), constituted by any one reversible coupling system adapted to reversibly connect a further tubular body (2.1).

* * * * *